No. 12,291. REISSUED NOV. 29, 1904.
H. W. FROST.
RAILWAY CAR BOLSTER.
APPLICATION FILED MAR. 24, 1904.
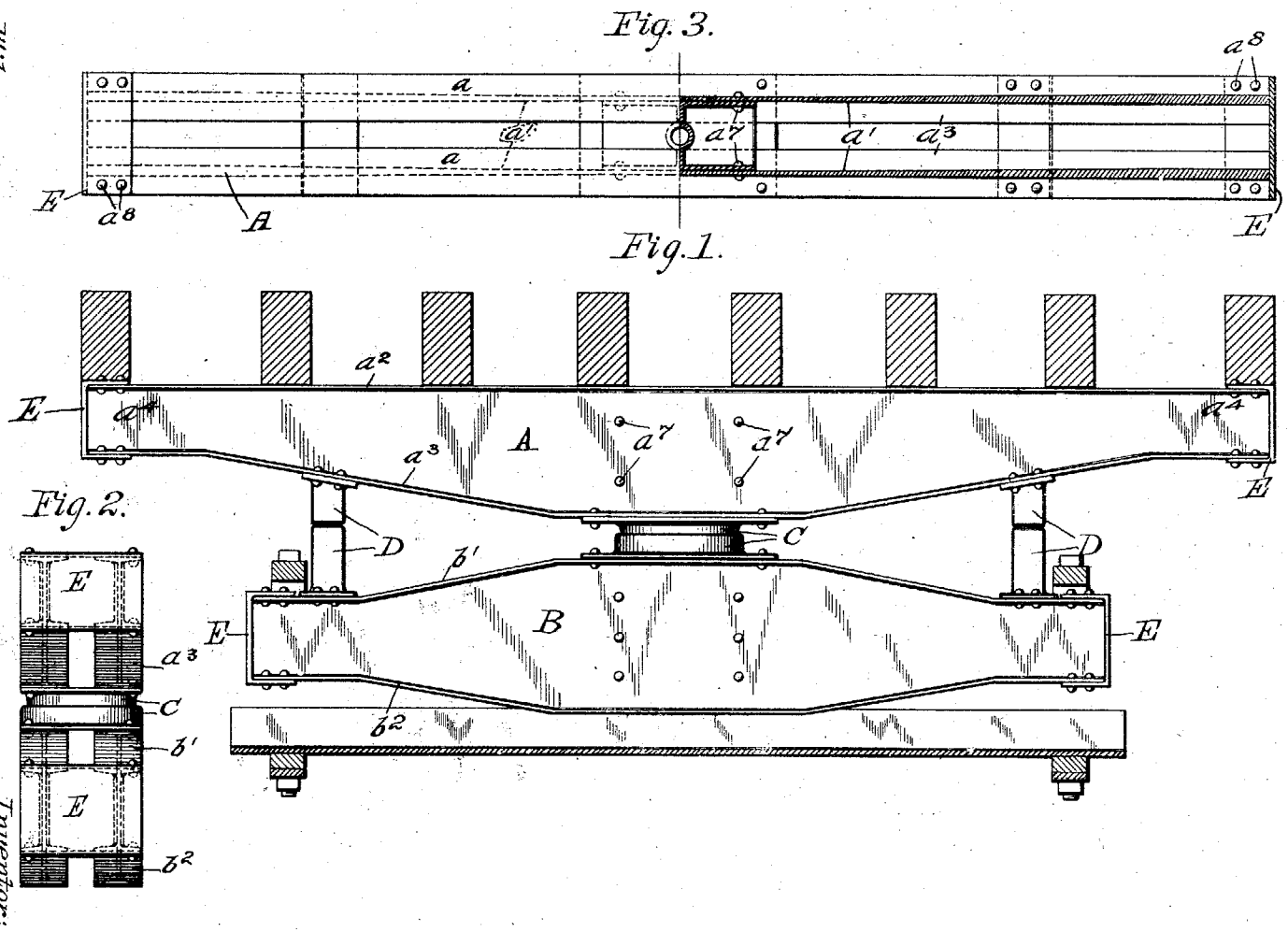
Witnesses:
J. H. Weisbrod
B. F. Funk
Inventor:
Harry W. Frost,
by Bakewell & Cornwall
Att'ys.
PHOTO-LITHOGRAPHED BY SACHETT & WILHELMS LITHO. & PTG. CO. NEW YORK.

No. 12,291. Reissued November 29, 1904.

UNITED STATES PATENT OFFICE.

HARRY W. FROST, OF DETROIT, MICHIGAN, ASSIGNOR TO CHICAGO RAILWAY EQUIPMENT COMPANY, OF CHICAGO, ILLINOIS, A CORPORATION OF ILLINOIS.

RAILWAY-CAR BOLSTER.

SPECIFICATION forming part of Reissued Letters Patent No. 12,291, dated November 29, 1904.

Original No. 697,466, dated April 15, 1902. Application for reissue filed March 24, 1904. Serial No. 199,799.

*To all whom it may concern:*

Be it known that I, HARRY W. FROST, a citizen of the United States, residing at Detroit, Wayne county, Michigan, have invented a certain new and useful Improvement in Railway-Car Bolsters, of which the following is a full, clear, and exact description, such as will enable others skilled in the art to which it appertains to make and use the same, reference being had to the accompanying drawings, forming a part of this specification.

This invention relates to improvements in railway-car bolsters of the particular class in which the ends of the bolsters are of less depth than the intermediate portions.

One of the objects of the invention is to provide a bolster which will possess the requisite amount of strength at the particular points at which it will be subjected to strains.

Another object of the invention is to provide a bolster the ends of which are reduced in depth, but which possess approximately the same sectional area as the intermediate portions of the bolster.

Other objects and advantages will hereinafter appear.

In the drawings, Figure 1 represents a view in elevation of a body-bolster and a truck-bolster applied to a portion of a car constructed in accordance with my invention. Fig. 2 is an end view of the respective bolsters; and Fig. 3 is a top plan view of the body-bolster, partly in section.

In the drawings the letters A and B illustrate the body and truck bolsters, respectively, which in Fig. 1 are illustrated as being associated in a well-known manner. Between these two bolsters are located the usual center bearings C and the side bearings D D. The construction of these two bolsters is substantially the same, with the exception that the transom or body-bolster is bellied or provided with a double taper on its lower side, while in the construction of the truck-bolster both the upper and lower sides are tapered.

I will describe bolster A, this description being applicable to bolster B. The bolster A is illustrated as comprising two approximately parallel beams $a$ $a$, each having the usual web $a'$, the top flange $a^2$, and the bottom flange $a^3$. Each piece $a$ is formed by reducing the depth of the end portion $a^4$, as shown in Fig. 1, so that the heights or depths of the respective ends will be less than the height or depth of the intermediate or middle portion of the bolster. This reduction in the height or depth of each end is accomplished by upsetting or compressing the web, so that the ends will be reduced in depth without removing any portion of the metal or permitting the molecules to be moved longitudinally the beam. The compression, which can be effected by suitable bulldozers or other suitable machinery, will reduce the depth of each end of the beam and at the same time spread the web so that the thickness thereof will be slightly in excess of the original thickness of the intermediate portion of the web, which is unaffected by the compression. Thus it will be seen that the same sectional area will be present at the ends of the bolster as that of the intermediate portion, although the bolster will be of varying depths.

By permitting the beam to remain deepest at its middle and compressing the ends in the manner just described a bolster is produced which is best capable, on account of its shape, of effectually supporting the load transmitted through it.

By reference to Figs. 1 and 2 it will be observed that the bolster A is formed by properly securing a plurality of the beams together. Rivets $a^7$ pass transversely through the webs of the respective beams to hold the usual malleable-iron filler-block in place, which filler-block is provided with an opening for the king-bolt, and the ends of the beams are connected by cap-plates E, which are secured to the flanges of the beams by fastening devices $a^8$.

A bolster constructed in accordance with my invention possesses strength and efficiency not heretofore found in the ordinary type of bolster whose ends are reduced, the strength being due to the fact that substantially the same cross-sectional area is present throughout the length of the beams.

By reference to Fig. 3 it will be observed that the thickness of the webs of the beams gradually increases from the center toward the ends. It is obvious that under certain conditions in constructing the bolster a single beam can be utilized instead of a plurality of beams.

Having thus described the invention, what is claimed as new, and desired to be secured by Letters Patent, is—

1. A tapering bolster-beam for cars, the same comprising a commercially-rolled member having flanged edges, the flanges at the medial portion and ends of said member being parallel, and the web at the ends of said member being thickened by compression, said thickened portions gradually decreasing in thickness toward the center; substantially as described.

2. A tapered bolster-beam for cars, the same being I-shaped throughout, the flanges thereof at the center and ends being parallel, and the web thickened by compression at the ends and gradually decreasing in thickness toward the center until it reaches the normal thickness of said web, whereby the same transverse sectional area is preserved throughout the length of the beam; substantially as described.

In testimony whereof I hereunto affix my signature, in the presence of two witnesses, this 19th day of March, 1904.

HARRY W. FROST.

Witnesses:

L. K. RUMSEY,

C. T. HANLON.